United States Patent [19]

Terashita

[11] Patent Number: 5,790,280
[45] Date of Patent: Aug. 4, 1998

[54] DIGITAL IMAGE RECORDING METHOD AND APPARATUS THEREFOR AND DIGITAL IMAGE PROCESSING APPARATUS

[75] Inventor: Takaaki Terashita, Kanagawa, Japan

[73] Assignee: Fuji Photo Film Co., Ltd., Kanagawa, Japan

[21] Appl. No.: 688,880

[22] Filed: Jul. 31, 1996

[30] Foreign Application Priority Data

Aug. 8, 1995 [JP] Japan ................................. 7-202323
Aug. 28, 1995 [JP] Japan ................................. 7-218851

[51] Int. Cl.⁶ ........................................... H04N 1/50
[52] U.S. Cl. ................................................ 358/501
[58] Field of Search ........................ 347/225, 232, 347/236, 246; 358/501, 518, 523, 524, 525

[56] References Cited

U.S. PATENT DOCUMENTS 4,769,715  9/1988  Feldman et al. ................ 347/226
5,200,837  4/1993  Sakurai ............................ 358/401
5,204,698  4/1993  LeSueur et al. ................ 347/140
5,508,826  4/1996  Lloyd et al. ..................... 358/501
5,680,171  10/1997  Lo et al. ......................... 348/42

*Primary Examiner*—Matthew V. Nguyen
*Attorney, Agent, or Firm*—Sughrue, Mion, Zinn, Macpeak & Seas, PLLC

[57] ABSTRACT

A digital image recording method is to make high quality positive reproduction images from any types of originals by processing image data of each original based on an image characteristic value such as an average density of a prime subject portion of the original, which is derived from the image data. A basic image recording amount, which is used for every pixel, is determined based on the image characteristic value. Based on the basic image recording amount and a value of image data assigned to a pixel, recording data of that pixel is determined, and the recording data is converted into an image control amount with reference to a look-up table. The image control amount is used in an image recording device for recording the reproduction image.

21 Claims, 8 Drawing Sheets

DIGITAL IMAGE RECORDING METHOD AND APPARATUS THEREFOR AND DIGITAL IMAGE PROCESSING APPARATUS

BACKGROUND OF THE INVENTION

1. Field of the Invention

The present invention relates to a method of recording an image using an image signal obtained using a digital imaging device such as an electric still camera, and an apparatus therefor. In particular, the present invention relates to digital image recording method and apparatus, and an image processing device, which are provided for processing digital image data obtained from a photographic image on photographic film or paper, so that the image may be recorded on various recording media including photographic film or paper, on the basis of the processed image data.

2. Background Art

In a conventional digital recording method, an image signal is obtained from a reflective original such as a photo-print or a transparent original such as a frame on negative or reversal photographic film, through a digital imaging device, and image signal control values are derived from the image signal. Based on the image signal control values, a reproduced image is recorded on a color photographic material or another recording medium. The image signal is controlled such that highlight and shadow of the original become highlight and shadow in the reproduced image. For example, JPA 56-87044 discloses that a highlight point and a shadow point of an original are detected to determine reproduction densities for these points, to obtain a tone reproduction curve connecting the two densities. JPA 59-15939, JPA 62-7290, JPA 2-236786 etc. disclose how to determine highlight and shadow points of the original with accuracy. JPA 6-242521 discloses using maximum and minimum values instead of highlight and shadow points. JPA 6-301123 discloses deriving a shadow point from an unexposed portion of the original.

JPA 6-311365 discloses that a test tablet is formed by use of a known light amount control signal, and the tablet is measured by a photometric device to obtain a density signal, so that a gradation table is made by comparison between the density signal and the light amount control signal.

JPA 61-238174 discloses that an accumulated density histogram is formed from the image signal, and is compared with a predetermined accumulated density histogram, to obtain a gradation correction signal for providing an optimum gradation. A method for making a conversion curve on the basis of an accumulated density histogram is disclosed in JPA 6-178113. There is disclosed a method of obtaining highlight and shadow points from an accumulated density histogram (JPA 1-253366), and an apparatus using an accumulated density histogram (JPA 5-91324).

Also, JPA 58-5744 discloses that a plurality of standard patterns and standard tone reproduction curves are memorized, so that one of the standard tone reproduction curves is selected depending upon which of the standard patterns is identical with the pattern of the original. A method of correcting a standard tone reproduction curve in accordance with the image is disclosed in JPA 60-216350, JPA 2-12244, JPA 6-178104 etc.

As set forth above, almost all conventional digital image recording methods are adapted to control the image signal to make highlight and shadow of the original highlight and shadow in the reproduced image. Therefore, a conversion table is used for converting a digital image signal (input) into an image recording signal (output). The conversion table is arranged such that the image recording signal has predetermined highlight and shadow points, i.e. white and black levels or densities, in correspondence with the digital image signal. Or the conversion table is formed from an accumulated density histogram.

Improvements have been suggested, for example, in JPA 60-216350 and JPA 62-111569, wherein highlight and shadow points are so determined as to evade color fogging or other failure at the highlight or the shadow point, or a tone reproduction curve is corrected based on an accumulated density histogram, or a specific middle density or half-tone point is added to improve the tone reproduction in the middle density range. Most of these methods are directed to recording or printing an image from an original recorded on reversal film, not to reproducing an image of an original recorded on negative film. Indeed the method disclosed in JPA 6-311365 obtains a representative value of a negative image on negative film by correcting a histogram, thereby to provide a conversion table based on the representative value and a conversion curve, but there is no concrete description about how to provide the conversion table.

On the reversal film, as having a small exposure latitude, most originals tend to have a white density at the highlight point, which approximates a base density of the reversal film, and a black density at the shadow point, which approximates the maximum density of the film. Moreover, in the reversal film, it is possible to control the exposure value for photographing an image with the intention of using the image as an original for digital printing, such that highlight and shadow points of the image are suitable for digital printing.

On the other hand, the negative film, which has a larger exposure latitude than the reversal film, involves the following problems:

1) Because of the larger exposure latitude of the negative film, highlight and shadow points of a negative original, especially an ordinary negative image that is photographed by ordinary people, do not always reproduce white and black on a color photographic material or paper. For instance, a portrait image with no blue sky nor white portion will not reproduce well. If the background is filled with garden trees, the shadow point tends to be dark green rather than black in the reproduced image. If the background is a colored wall or furniture in flash photography, the shadow point will have a hue. Therefore, the quality of the image reproduced from the negative image will not always be sufficient if the image signal is processed in the same way as for the positive image on the reversal film.

2) In those scenes which contain very bright portions, or a distinctly brighter background than the prime subject, or high reflective portions, the prime subject will be darker than the original density. Even in flash photography, the density of the reproduced human face will change depending upon the difference in density between the human face and the background.

3) The image recording method using the highlight and shadow points merely controls the gradation of the reproduced image in accordance with the contrast of the original so as the highlight and shadow points both are included in a density reproduction range of the recording material for the reproduction. Accordingly, those images for which highlight and shadow are unnecessary to reproduce, cannot be reproduced with sufficient quality. In that case, the gradation correction can even deteriorate the quality of the image by unnecessary or unnatural reproduction of highlight and shadow.

On the contrary, in a frame exposure method wherein an image is reproduced on a color photosensitive materials or paper by exposing the photosensitive paper to an optical image which is formed by light projected through a negative frame on negative film, because the image recorded on the negative film is directly used, the reproduced image is more natural and real, even through the gradation of the color photosensitive material has effect on the gradation of the reproduced image.

Since the latest color photographic printers can make high quality photo-prints from color negatives, most of these photo-prints, hereinafter referred to as frame exposure prints, are not worth reprinting as digital prints through digital processing and correcting of their image signals. Rather, unnecessary or insufficient image signal correction can result in unexpected or deteriorated image quality, compared with the frame exposure prints.

OBJECT OF THE INVENTION

In view of the foregoing, a prime object of the present invention is to provide a novel digital image recording method which evades the disadvantages of the above described digital image recording methods which are based on highlight and shadow points and/or an accumulated density histogram.

Another object of the present invention is to provide a digital image recording method which can stably reproduce high quality images which is comparable to the frame exposure prints.

A further object of the present invention is to improve the yield of good quality prints from digital image signals by changing signal processing steps between those originals which are suitable also for frame exposure printing, and those unsuitable for frame exposure printing.

The present invention is also made to achieve as stable reproduction quality as the frame exposure printing, while enjoying the advantage of digital image processing.

Another object of the present invention is to make use of exposure determination methods in the frame exposure printing applicable in processing digital image signals, adding those advantages specific to digital recording.

SUMMARY OF THE INVENTION

To achieve the above and other object, the present invention provides a digital image recording method for recording a positive reproduction image based on image data of a negative or positive original, which comprises the steps of:
  obtaining an image characteristic amount from the image data of the original;
  determining a basic image recording amount from the image characteristic amount, the basic image recording amount being used for every pixel of one color;
  determining an image control amount for a color pixel from the basic image recording amount and a value of the image data assigned to the color pixel; and
  recording the color pixel in accordance with the image control amount.

The method of the present invention may further comprises the steps of:
  determining recording data for recording a color pixel based on the basic image recording amount and a value of the image data assigned to the color pixel;
  predetermining a look-up table or function defining a relationship between the recording data and a first image control amount necessary for obtaining a recording density corresponding to the recording data;
  determining the first image control amount from the recording data in accordance with the relationship; and
  recording the color pixel in accordance with the image control amount.

It is preferable to obtain a second image control amount based on a highlight point and a shadow point of the original, so as to permit selecting one of the first and second image control amounts depending upon conditions of the original, and record each color pixel in accordance with the selected one of the first and second image control amounts.

The image characteristic amount may be an average of those image data values detected from an entire area or a part of the original, or an average of selected image data values. On the other hand, the basic image recording amount may be constituted of a density control value and a color control value for controlling density and color of the positive reproduction image.

According to another variation of the present invention, a digital image recording method for recording a positive reproduction image based on image data of a negative or positive original comprises the steps of:
  dividing the original into a large number of pixels to obtain the image data from the pixels;
  deriving from the image data a plurality of image characteristic amounts which characterize the original, the image characteristic amounts including an average of those image data values obtained from a predetermined area of the original, an average of those image data values obtained from selected pixels, and differences between the image data values;
  determining a basic image recording amount from the image characteristic amounts by an operation, the basic image recording amount defining color and density of the positive reproduction image;
  determining recording data of a pixel from the basic image recording amount, a value of the image data assigned to the color pixel, and a predetermined recording condition value; and
  recording the color pixel in accordance with the recording data.

The recording condition value is predetermined so that a positive reproduction image made from a reference original will have predetermined color and density.

According to the present invention, those exposure control methods which have been used in the conventional frame exposure printing method are applied to the digital printing method where image data is processed through a digital processing unit to be corrected in gradation and density balance with reference to highlight and shadow points or an accumulated density histogram. Therefore, the present invention takes advantages of both the digital image processing and the frame exposure printing, so that the quality of the reproduced image is improved while the quality variation between the reproduced images is minimized, compared with the conventional digital printing method.

Since the conventional digital printing methods have been attaching much importance to reproduction of highlight and shadow of the original, the prime subject is not always reproduced with sufficient color and density. As the present invention permits deciding reproduction conditions on the basis of data relating to the prime subject which is entered from outside or extracted from the image data, the density and color of the prime subject can be reproduced well.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
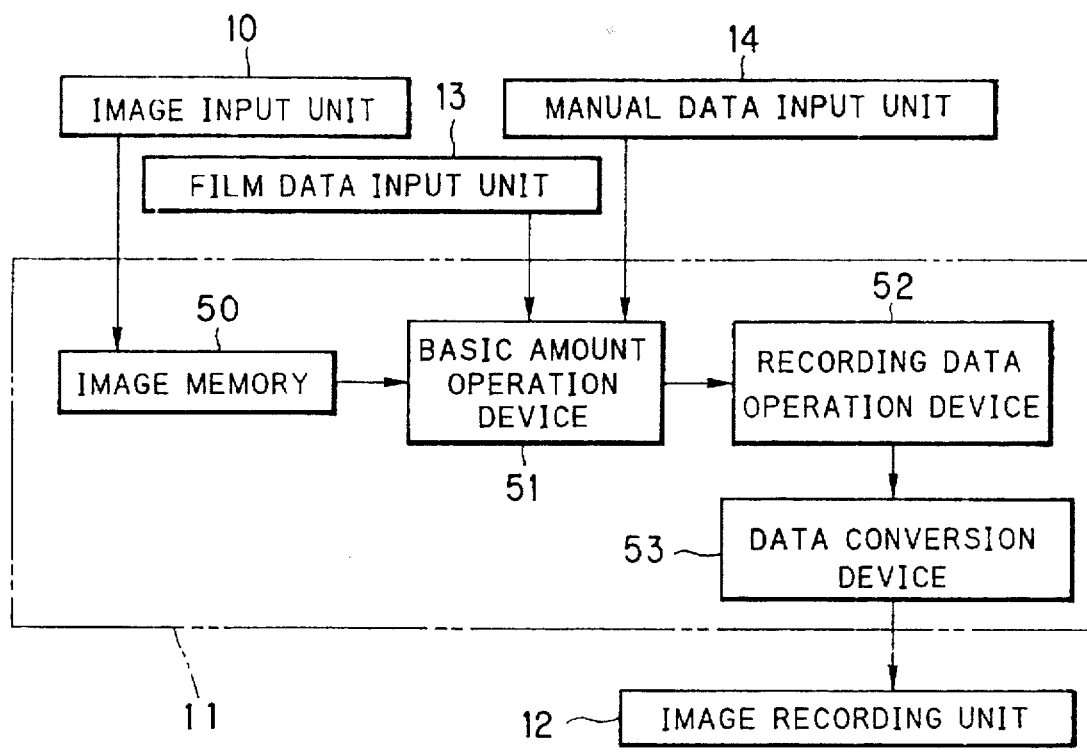
FIG. 1 is a functional block diagram of a digital image recording apparatus according to an embodiment of the invention.

FIG. 1 shows a digital image recording apparatus constituted of an image input unit 10, an image processing unit 11, an image recording unit 12, a film data input unit 13 and a manual data input unit 14.

Figure 2:
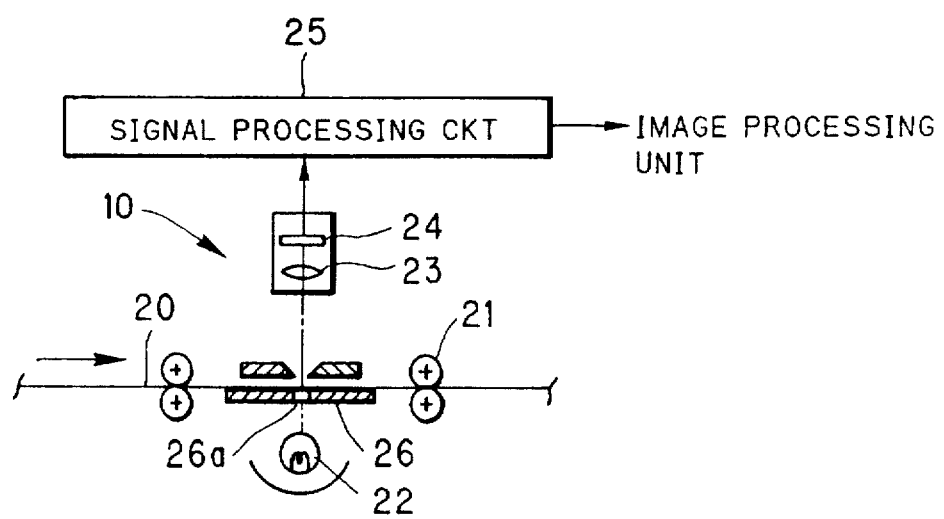
FIG. 2 is an explanatory view of an image input unit of the digital image recording apparatus.

As shown in FIG. 2, the image input unit 10 reads an image on photographic film 20 to convert it into image data. The image input unit 10 is constituted of a film feeding device 21, a light source 22 for illuminating the film 20, a lens 23, a CCD (charge coupling device) line sensor 24, and a signal processing circuit 25. The light source 22 has a plate 26 with a slit 26a which extends orthogonal to a feeding direction of the film 20, and through which light from the light source 22 is projected as a slit light onto the film 20. The slit light, after passing through the film 20, is focused by the lens 23 onto a light receiving surface of the line sensor 24, so that the line sensor 24 photo-electrically convert the optical image into a line image signal. The film feeding device 21 feeds the film 20 line by line in synchronism with the line image signal detection. However, the image input unit 10 shown in FIG. 2 is a mere example. A scanner, still video camera, TV camera, video recording player, personal computer and the like may be used as the image input unit.

The detected line image signal is sent to the signal processing circuit 25, which then converts the line image signal to digital image data through an A/D converter, and outputs the image data to the image processing unit 11, after correcting the image data so as to eliminate the effect of variation in properties between photo-electric elements of the line sensor 24 or the shading effect. If necessary, the signal processing circuit 25 also effects density conversion or other signal processing.

The image processing unit 11 converts the digital line image signal from the image input unit 10 into a recording control signal with reference to data entered through the film data input unit 13 and a manual data input data 14. The film data input unit 13 is to enter film type data, frame data, photography data, print data etc. The manual data input unit 14 is to enter various commands such as print condition correction data. The image processing unit 11 performs an image reversion process depending upon whether the original is a positive image or a negative image, and also sharpness correction, color enhancing correction, character or pictorial image merging, enlargement and reduction, trimming or cropping, and other necessary corrections such as gradation correction.

Figure 3:
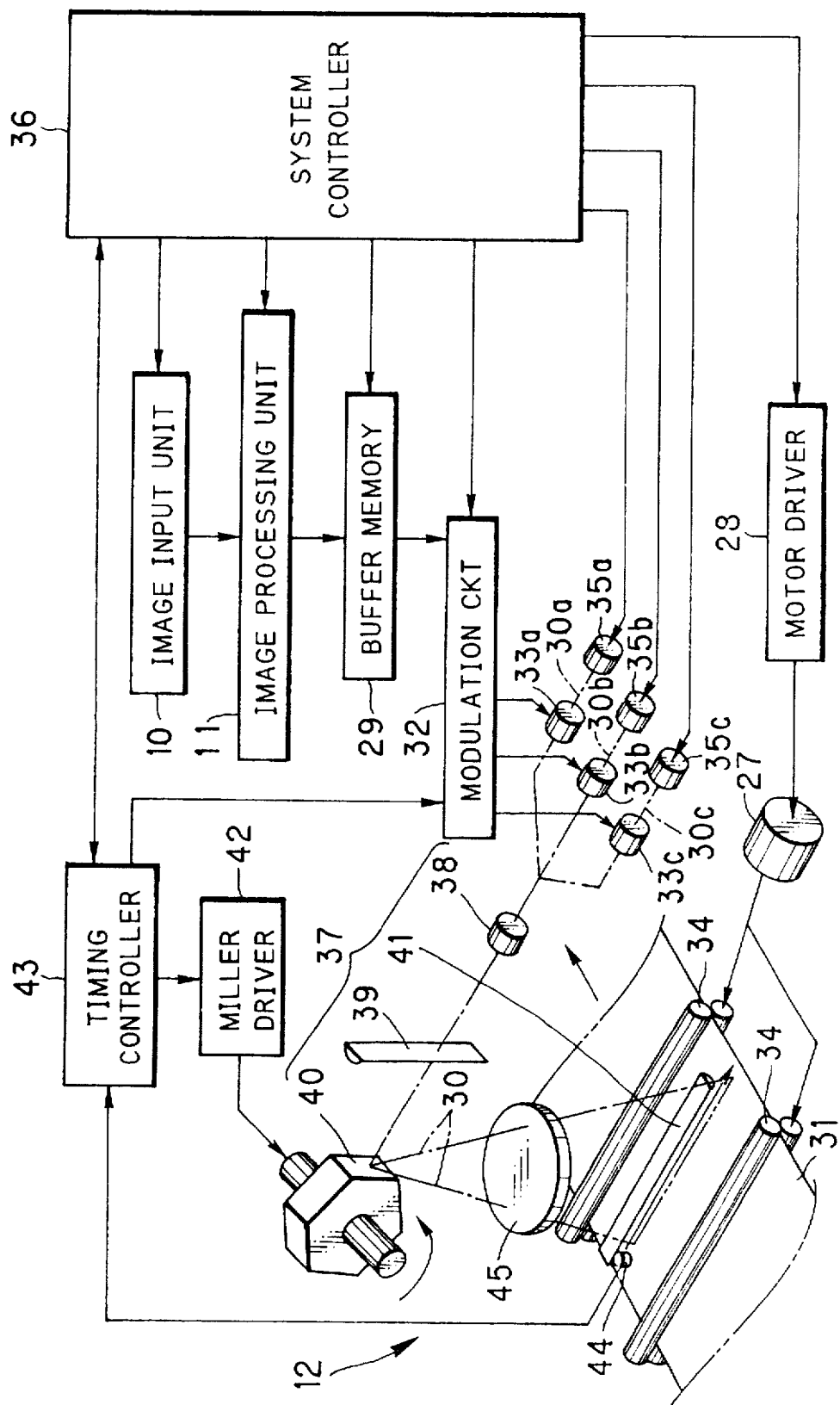
FIG. 3 is an explanatory view of an image recording unit of the digital image recording apparatus.

In the image recording unit 12, as shown in FIG. 3, a light beam 30 is projected onto a silver salt photographic color photosensitive material, so-called color photographic paper 31 to print the image read from the film 20 on the color photographic paper 31. Specifically, red (R), green (G) and blue (B) beams 30a, 30b and 30c are generated from beam generators 35a, 35b and 35c, in correspondence with yellow, magenta and cyan photosensitive layers of the color paper. The three color beams 30a to 30c are modulated by a modulation circuit 32 and three light modulators 33a, 33b and 33c in accordance with the recording control signal which is sent from the image processing unit 11 through a buffer memory 29.

The beams 30a to 30c thus modulated are converged into one beam by not-shown mirrors. The one beam is deflected by a light deflection device to swing in a main scan direction, i.e. the widthwise direction of the color photographic paper 31. Synchronously with the main scan of the beam, a paper feed roller pair 34 feeds the color photographic paper 31 in the subsidiary scan direction that is orthogonal to the main scan direction. The paper feed roller pair 34 is rotated by a motor 27 which is controlled by a system controller 36 through a motor driver 28. The system controller 36 totally controls respective systems of the digital image recording apparatus. With the subsidiary scan of the color photographic paper 31 and the main scan of the beam, a latent image of the original on the film 21 is exposed on the color photographic paper 31. The exposed paper 31 is developed in a conventional paper processor, and is cut into pieces of photo-prints.

The light deflection device 37 is constituted of a collimator 38, a cylindrical lens 39, a polygon mirror 40, and a second cylindrical lens 41. The polygon mirror 40 is rotated by a mirror driver 42. A timing controller 43 generates a synchronizing signal based on a beam detection signal from a beam sensor 44, and sends it to the modulation circuit 32. An fθ lens 45 converses the beam to a diameter corresponding to a pixel to be recorded.

Referring again to FIG. 1, the image processing unit 11 calculates exposure amounts for respective pixels in a manner as set forth below. Although the image processing unit 11 performs sharpness correction, color enhancing correction, character or pictorial image merging, enlargement and reduction, trimming or cropping, and special gradation correction, function blocks for these processes and the description thereof are omitted, because these processes are not essential to the present invention. The image data from the image input device 10 is once written in an image memory 50, and then sent to a basic amount operation device 51.

The basic amount operation device 51 determines a basic image recording amount Dmi (i=R, G or B) based on the image data of each original, specifically three color density of each original. As the basic image recording amount Dmi, an average density of one of predetermined areas of the original, such as the entire area and a limited area, is selected. The basic image recording amount Dmi may be an average density weighted according to positions of the pixels, an average density of selected pixels, or an average density weighted according to positions of selected pixels. The basic image recording amount Dmi is one or both of a density control value (or density correction value) Dmdi for controlling density of the image and a color control value (or color correction value) Dmci for controlling color of the image.

The density control value Dmdi may be calculated according to those methods disclosed in JPA 51-138435, JPA 53-145621, JPA 54-28131, JPA 59-164547 etc. The color control value Dmci may be calculated according to those methods disclosed in JPA 55-26569, JPA 61-223731, JPA 2-90140, JPA 3-53235, JPA 5-289207 etc. The basic image recording amount Dmi may be a value characterizing an original image, especially a value characterizing a prime subject density such as disclosed in JPA 5-100328, or a value correlated with a prime subject density, such as a weighted average of a maximum value (or a highlight density) and a minimum value (or a shadow density), a weighted average obtained by weighting respective pixels, e.g. respective grades of a density histogram, or a value corresponding to a specific or selected frequency in an accumulated density histogram.

A recording data operation device 52 is provided for operating recording data to determine a light projection amount for each color of a pixel. Concretely, recording data Eij of each color pixel is calculated according to the following equation (1), and is sent to a data conversion device 53:

$$Eij = ki \cdot Sij \cdot 10^{Dmi+bi} \quad (1)$$

wherein

Sij: image data or a photometric value of a color pixel of an original (an anti-logarithm);

i: R, G or B;

j: a pixel serial number;

Dmi: a basic image recording amount;

bi: a value given to correct variations in image data caused by factors relating to the photographic paper 31, the image input unit 10, the image recording unit 12 etc., or various daily variations;

$10^{Dmi+bi}$: a value determined by each original; and ki: a coefficient, usually 1.0, but may be changed according to the image data Sij or depending upon whether the original is a negative or a positive image.

The data conversion device 53 obtains an image control amount Fij from the recording data Eij with reference to a conversion table correlating the recording data Eij with the image control amount Fij, and outputs the image control amount Fij to the image recording unit 12. The conversion table is designed to determine the image control amount Fij depending upon one or more than one condition for obtaining a given recording density from a given value (=RI) of the recording data Eij. For example, such a condition or conditions are used, where the given value RI of the recording data Eij results in a recording density of "0.10". Therefore, based on a recording density DRIij which is obtained in response to an output signal generated from a predetermined image control amount Fij, the relationship between the image control amount Fij and the recording density DRIij is previously determined. And based on this relationship, the relationship between the recording data Eij and the image control amount Fij is determined.

Figure 4:
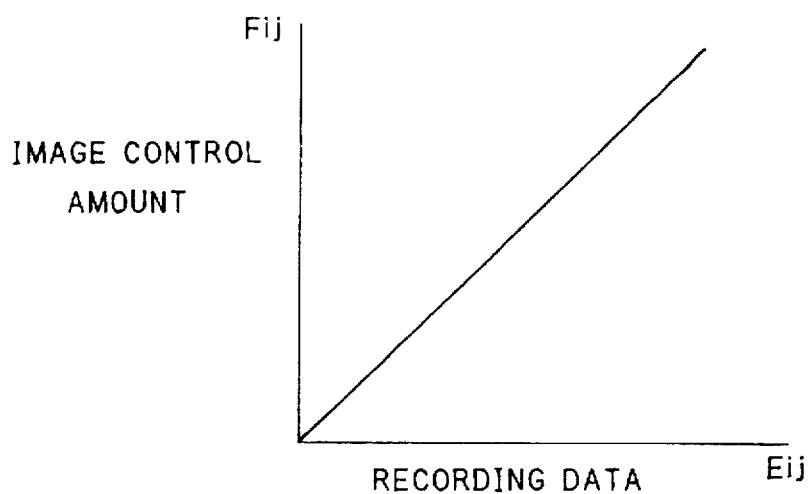
FIG. 4 is a graph illustrating a data conversion table of a data conversion device.

The relationship may be expressed as a functional equation so as to obtain the image control amount Fij by operation, instead of using a look-up table memory (LUT). The relationship between the recording data and the image control amount is influenced by spectral properties of photosensors of the image input unit or the image recording unit, and properties of the photosensitive material. Therefore, it is desirable to determine and revise the relationship for each individual image recording apparatus or in accordance with the type of photographic paper. FIG. 4 shows an example of conversion table between the recording data Eij and the image control amount Fij.

Figure 5:
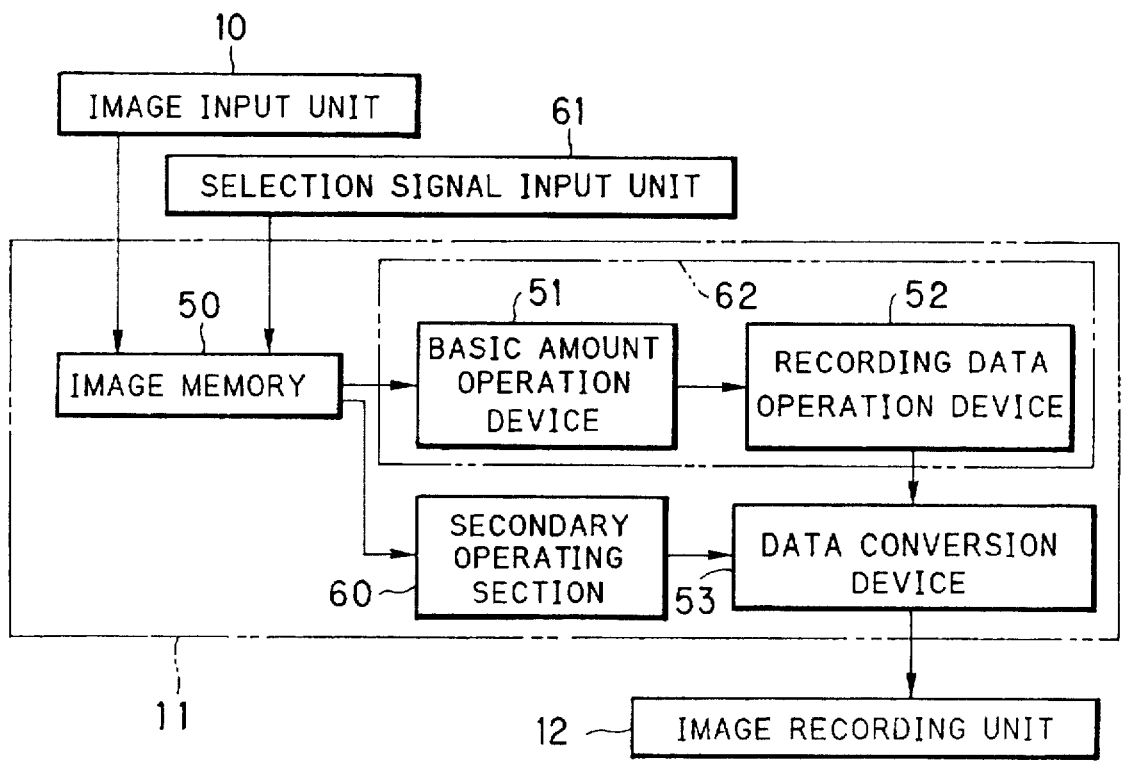
FIG. 5 is a functional block diagram of a digital image recording apparatus according to a second embodiment of the invention.

FIG. 5 shows an alternative embodiment of the present invention, wherein an image processing unit 11 is provided with a secondary operating section 60 in addition to a primary operating section 62 which is constituted of a basic amount operation device 51 and a recording data operation device 52 which are equivalent to those shown in FIG. 2. A selection signal input unit 61 is connected to the image processing unit 11, so that one of the primary and secondary operating sections 62 and 60 is selected responsive to a selection signal from the selection signal input unit 61. The secondary operating section 60 is designed to obtain recording data based on a maximum reference value and a minimum reference value of the image data, and more specifically for correcting the image data based on the maximum and minimum reference values.

The secondary operating section 60 is selected for those scenes or images photographed under artificial illumination light such as tungsten light, luminescent light, in the evening or in the shade, or low contrast scenes such as cloudy or hazy landscape, or for under-exposed frames on photographic film. It is also useful to select the secondary operating section 60 for positive originals such as frames on reversal film or photo-prints. The selection signal may be determined depending upon visual observation of a simulated image on a monitor such as a CRT display.

Figure 6:
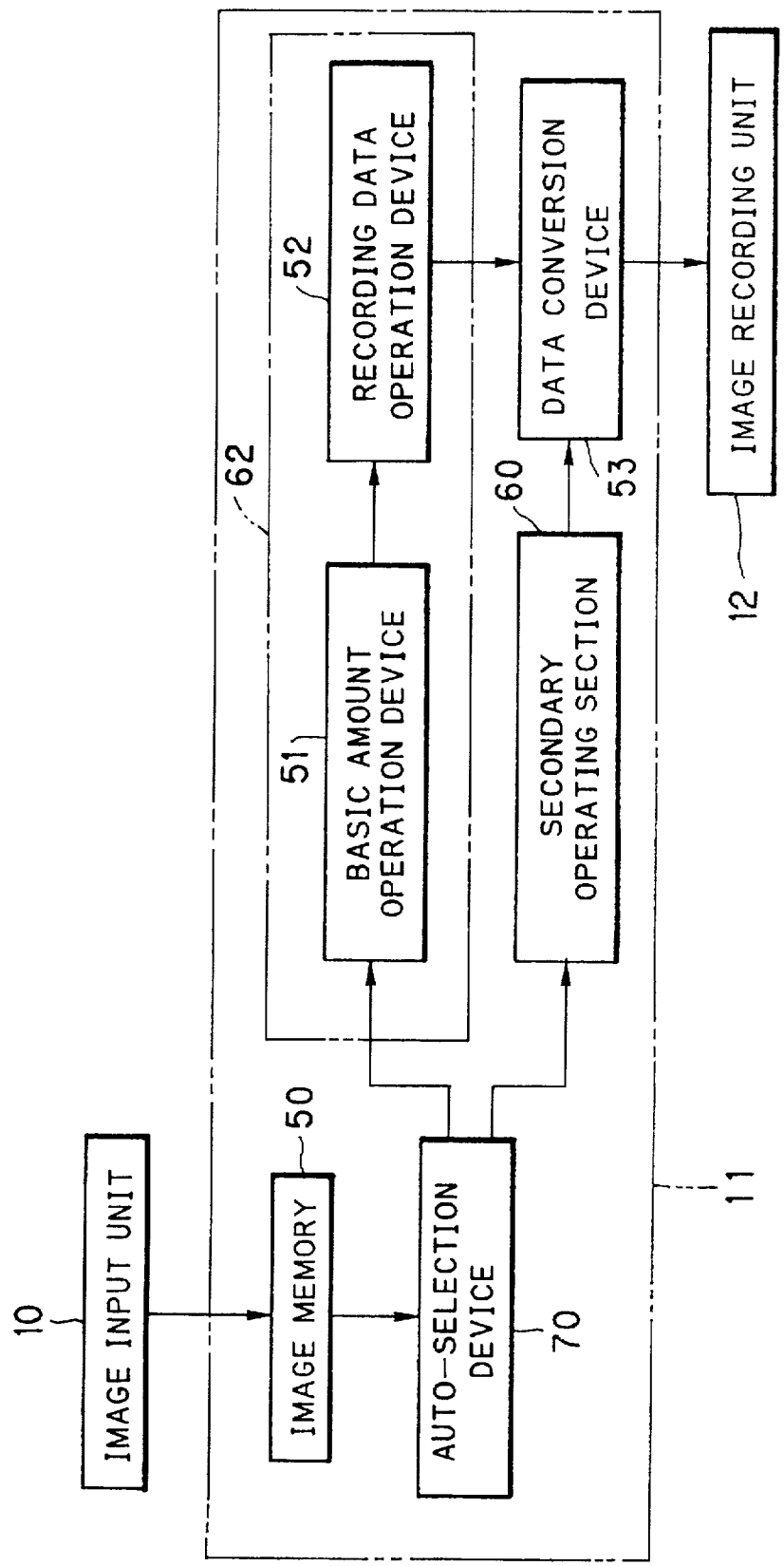
FIG. 6 is a functional block diagram of a digital image recording apparatus according to a third embodiment of the invention.

It is alternatively possible to provide an auto-selection device 70 in place of the selection signal input unit 61, as shown in FIG. 6. The auto-selection device 70 deduces the conditions of the original from the image data, and selects depending upon the deduced conditions one of the primary and secondary operating sections 62 and 60. For example, where a highlight point and a large number of pixels in highlight areas of the original have a hue similar to the color of an artificial light source, the secondary operating section 60 is selected, and the image control amount Fij is determined such that the highlight point and highlight areas are finished as white.

For example, as disclosed in JPA 6-242521, a maximum reference value and a minimum reference value of the image data are determined for each color, and a conversion function for correlating the maximum and minimum reference values with predetermined values is obtained for each color, to provide a conversion table for image control amount in the secondary operating section 60. This conversion table is used in the data conversion device 53 to obtain the image control amount.

In the recording data operation device 52, the recording data Eij of each color pixel is to be determined as a function of the image data Sij and a value DMi ($=10^{Dmi}$) which is defined by characteristic values of each original: Eij=f(Sij, DMi) or logEij=g(Sij, DMi). For example, it is possible to substitute the following equations (2) to (5) for the above equation (1):

$$Eij=Ki\cdot Sij\cdot DMi \quad (2)$$

wherein

Ki: a coefficient given to correct variations in image data caused by factors relating to the photographic paper 31, the image input unit 10, the image recording unit 12, etc., and various daily variations; and DMi: a value determined by each original.

$$Eij=EXi\cdot ki\cdot (Tij/Toij) \quad (3)$$

wherein

EXi: an exposure amount for obtaining a proper reproduction image density;

Tij: image data of a color pixel (a transmission light amount or a reflection light amount of each color for each pixel of an original); and Toij: image data of each color detected from a blank portion bearing no image on a recording medium of the original.

The above equation (3) can be converted into a logarithmic equation:

$$\log Eij = \log EXi + \log ki(Tij/Toij) = (ai\cdot Dmi+bi) - k'i\cdot Dij \quad (4)$$

wherein

Dij: image data of a color pixel, or a color density of a pixel of an original (a logarithm);

k'i: a coefficient, usually 1.0, but may be changed according to the image data Dij or depending upon whether the original is a negative or a positive image (an appropriate value of this coefficient can control three color gradation balance); and ai: a coefficient (usually 1.0).

To use the equation (4), the recording data operation device 52 should have a conversion table for converting the value logEij into the value Eij. The above coefficient ki and k'i are effectively used for selecting a coefficient or a coefficient table according to film data so as to improve gradation adaptability between the original and the recording material for reproduction. It is to be noted that any recording data determination methods that may be led from the above numerical equations are to be included in the scope of the present invention.

It is also possible to use "Dmi−Doi" in place of the basic image recording amount Dmi (Doi: a reference image for setting up image recording conditions), as in the following equation:

$$\log Eij = ai(Dmi-Doi) - k'i\cdot Dij+bi \quad (5)$$

wherein the coefficient "ai" may vary depending upon the value "Dmi−Doi".

As shown in the equations (4) and (5), the image data is inverted when the density Dij is a negative value. Therefore, any special signal inversion process is not necessary for a negative original, while an inversion process is necessary for a positive original to obtain a positive reproduction image, when the recording material or the photographic paper is directed to reproducing an image from the negative film.

As described above, the basic image recording amount Dmi may be a value characterizing an original image, especially a value characterizing a prime subject density or a value correlated with a prime subject density, such as a weighted average of a maximum value (or a highlight density) and a minimum value (or a shadow density), a weighted average obtained by weighting respective pixels, e.g. respective grades of a density histogram, or a value corresponding to a specific or selected frequency in an accumulated density histogram.

The basic image recording amount Dmi may also be a reference value, a value specific to the original, or a value derived from that value. The reference value may be a reference image density, a predetermined reference value, or a value specific to the film bearing the original, e.g. an average density of original images recorded on a plurality of filmstrips of the same type, or a characteristic value derived from image data detected from all frames of a filmstrip including the original to be reproduced. The reference value may also be a function including these values. It is possible to input image data of all frames of a filmstrip at one time, and then process the image data. Thereby, in addition to the image data of the original to be reproduced, a characteristic value derived from image data of all frames of a filmstrip or those of a plurality of filmstrips can be taken into consideration for determining the basic image recording amount Dmi.

Using the basic image recording amount Dmi permits extracting a prime subject (human faces) from the original image to use the density of the prime subject as a density control value Dmdi for controlling the image density, as described for example in JPA 52-156624, JPA 2-287531 and JPA 4-346332. Thereby, high quality prints can be obtained automatically.

It is possible to connect a film data input unit to the basic amount operation device 51 in the embodiments shown in FIGS. 5 and 6. The film data input unit reads a DX code from the photographic film so as to discriminate the film type of the original. It is preferable to accumulate image data (density values) for each film type to determine the basic image recording amount Dmi. As an image data accumulating method, those disclosed in JPA 55-46741 and JPA 62-144158 are applicable. Using an weighted average of the basic image recording amount and image data accumulated for each film type, in place of the basic image recording amount Dmi, is effective to prevent color variance between the images. It is also possible to detect neutral three color balance and three color balance of an average image from the accumulated image data for each film type, and use these color balance values for color control or extraction of a specific image.

Furthermore, it is possible to enter camera data of the camera used for photographing the original through a manual data input unit, a magnetic device, or a electric device, so that the camera data may be utilized for the image processing, as described in JPA 2-278249 and JPA 3-153229. It is also possible to utilize film production data or frame trimming or cropping data for the image processing, as described in JPA 3-120527.

In the above embodiments, a look-up table or a function is predetermined to show a relationship the recording data and the image control amount for obtaining corresponding image recording density, so that the image control amount for use in the image recording may be obtained from the recording data. However, based on a relationship between the image data and the recording data as well as a relationship between the recording data and the image control amount, it is possible to provide for each original a conversion table which shows a relationship between the image data (input data) and the image control amount (output data), so that the image control amount may be obtained directly from the image data. This modification should be included in the present invention. Any other variations and modifications that may be possible based on the above-described equations and methods should be considered to be included in the present invention.

Figure 7:
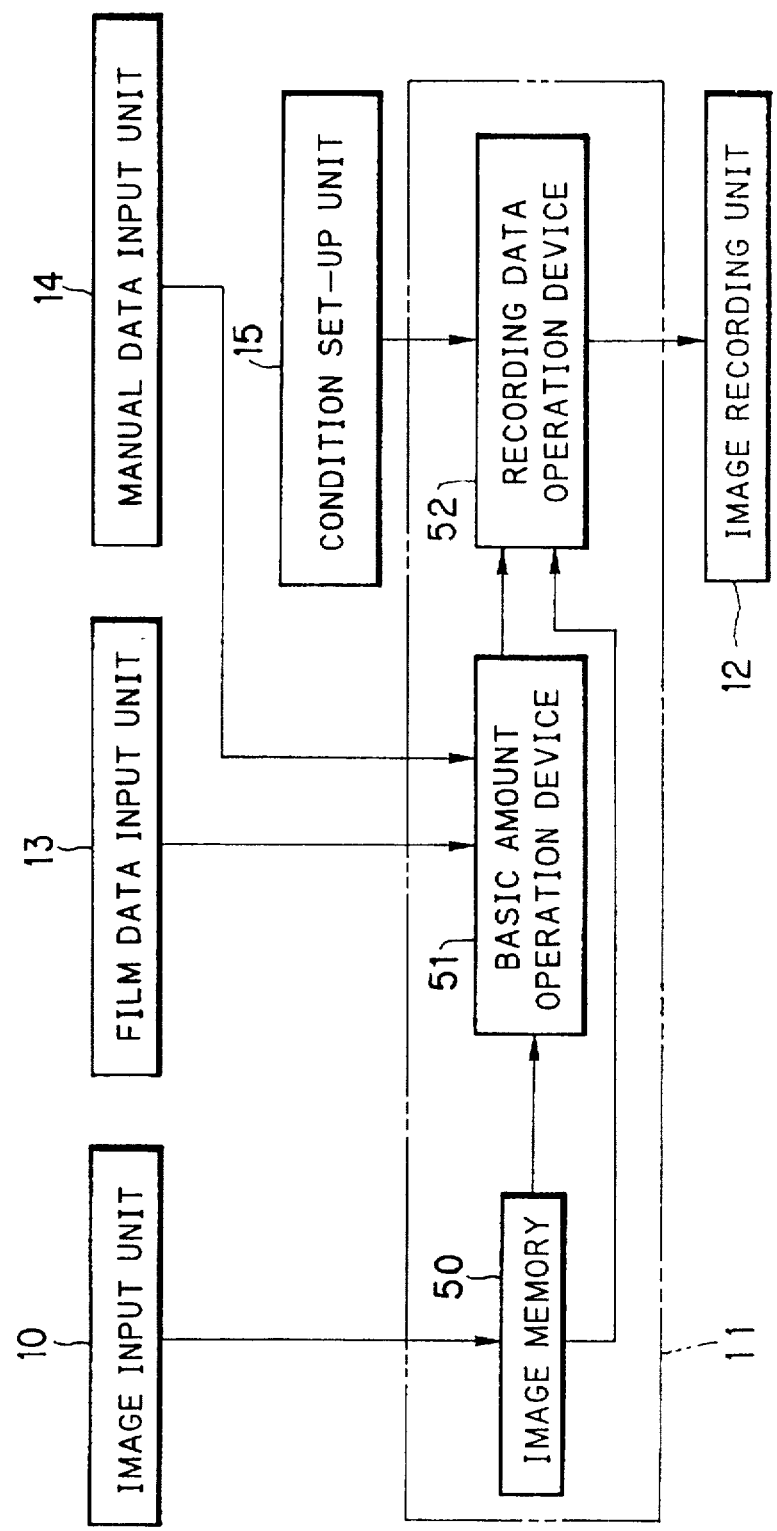
FIG. 7 is a functional block diagram of a digital image recording apparatus according to a fourth embodiment of the invention.

FIG. 7 shows essential parts of a further embodiment of the present invention, which has fundamentally the same construction as the first embodiment shown in FIGS. 1 to 3, but a condition set-up unit 15 is connected to a recording data operation circuit 52 of an image processing unit 11, and the image processing unit 11 of this embodiment has no data conversion circuit like the data conversion device 53. Therefore, detailed description of those parts which are designated by the same reference numbers as in the above embodiments will be omitted as being equal or equivalent to each other.

In the embodiment shown in FIG. 7, recording data outputted from the recording data operation circuit 52 is utilized in an image recording unit 12 for controlling light beams to print a reproduced image on a recording material 31. The image recording unit 12 may also operate in the same way as described with respect to the above embodiments.

The recording data logEij is determined according to the following equation:

$$\log E_{ij} = A_i(D_{mi} - D_{ij}) - \Delta D + B_i \qquad (6)$$

wherein

Ai: a coefficient determined through the condition set-up unit 15, for correcting variations in spectral characteristics between an image input unit 10 and the image recording unit 12 and the recording materials;

Dmi: Dmdi+Dmci

Dij: image data of a color pixel, a density;

ΔD: a density and color correction value determined by visual observation and entered through a manual data input unit 14; and Bi: a coefficient determined through the condition set-up unit 15, for correcting variations caused by factors relating to the recording materials and the recording device, and daily various variations.

The above coefficients "Ai" and "Bi" are determined through the condition set-up unit 15 such that a reference image or a reference image signal have predetermined color and density. For example, the coefficients Ai and Bi may be determined according to a print condition set-up method conventionally used in a frame exposure type photo-printer, by use of a printer control negative kit. It is possible to determine and adjust the coefficients Ai and Bi individually for each function. For example, the coefficients Ai and Bi are adjustable according to the types of the image input device, the output device, the recording material and the original. It is preferable to permit automatic setting and adjusting the coefficients Ai and Bi based on values measured from the original.

Figure 8:
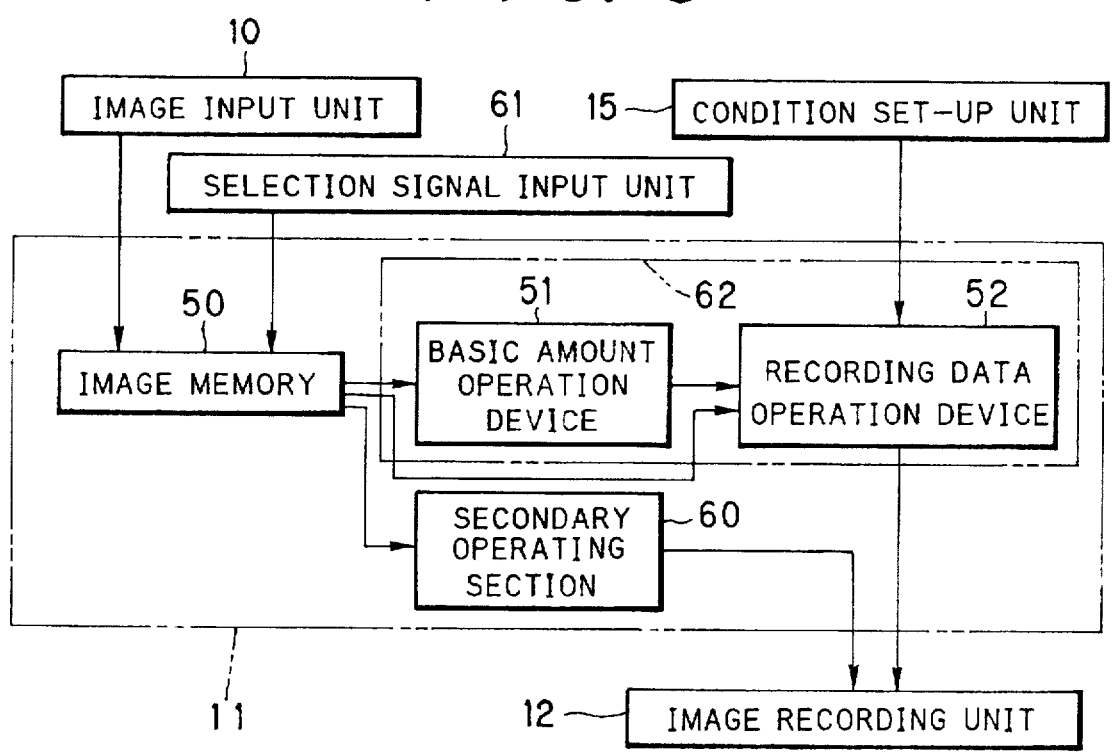
FIG. 8 is a functional block diagram of a digital image recording apparatus according to a fifth embodiment of the invention.

As a variation of the embodiment shown in FIG. 7, it is possible to provide a secondary operating section 60 in addition to a primary operating section 62 consisting of a basic amount operation device 51 and a recording data operation device 52, as is shown in FIG. 8, so that one of the primary and secondary operating sections 60 and 62 may be selected depending upon a selection signal entered through a selection signal input unit 61. The secondary operating section 60 may operate in the same way as described with respect to the embodiment shown in FIG. 5.

Figure 9:
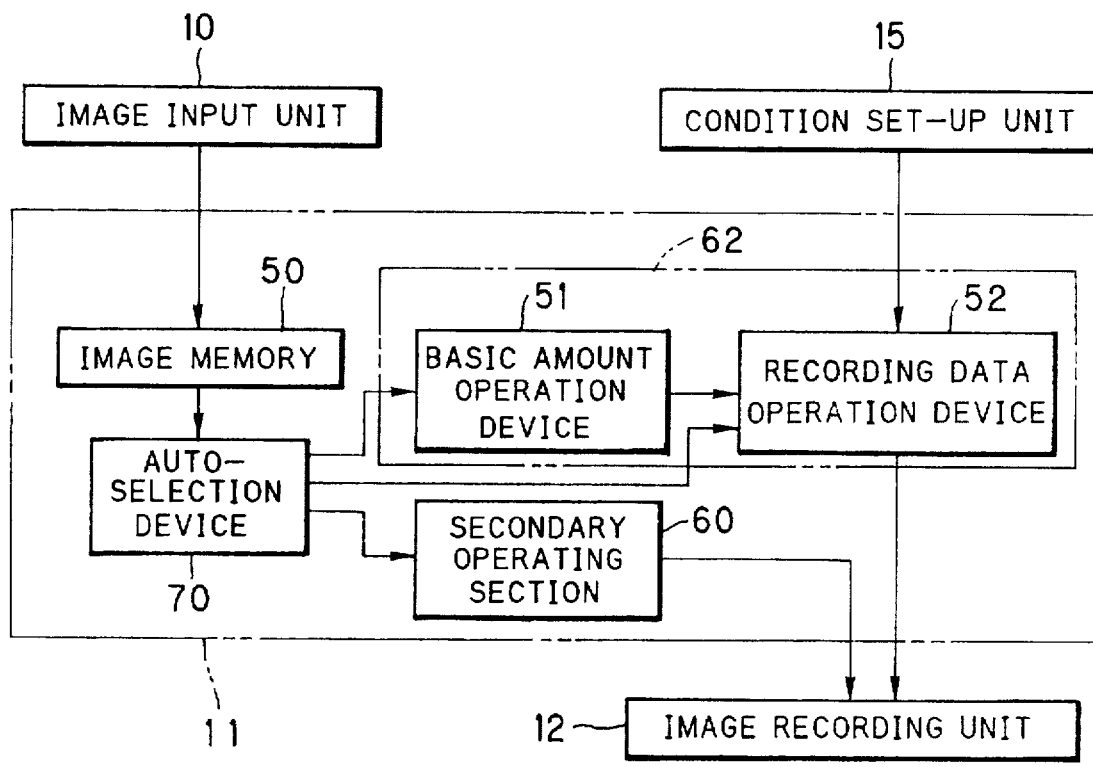
FIG. 9 is a functional block diagram of a digital image recording apparatus according to a sixth embodiment of the invention.

It is also possible to provide an auto-selection device 70 in place of the selection signal input unit 61, as is shown in FIG. 9. The auto-selection device 70 may operate in the same way as described with respect to the embodiment shown in FIG. 6.

The recording data operation device 52 may use any of the above-described equations (3) to (5) for obtaining recording data logEij, wherein the coefficients "ai" and "bi" may be determined through the condition set-up unit 15 in the same way as described with respect to the equation (6).

It is also possible to connect a film data input unit and/or a manual data input unit to the basic amount operation device 51 in the embodiments shown in FIGS. 8 and 9. The film data input unit may operate in the same way as described above.

Figure 10:
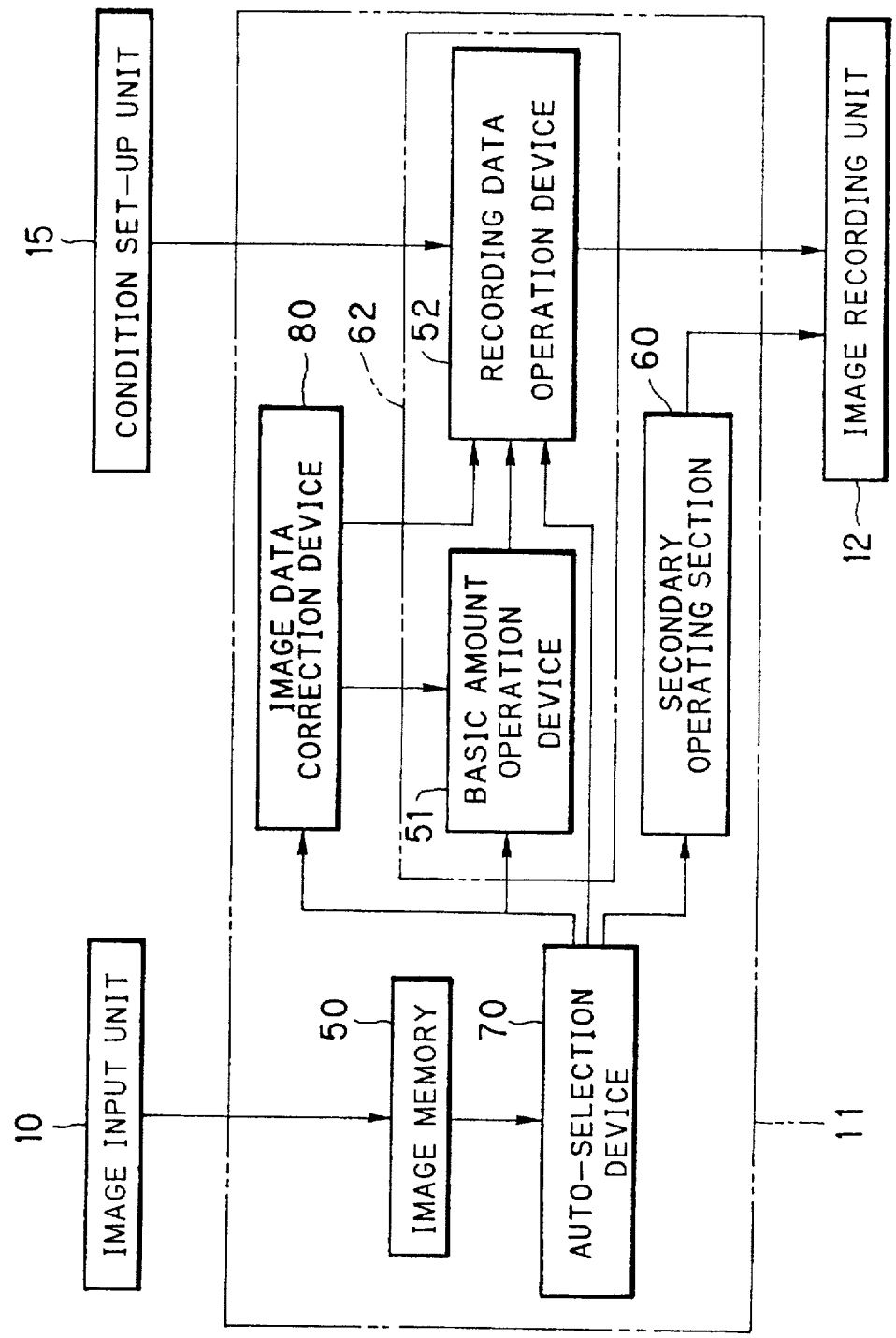
FIG. 10 is a functional block diagram of a digital image recording apparatus according to a seventh embodiment of the invention.
Figure 11:
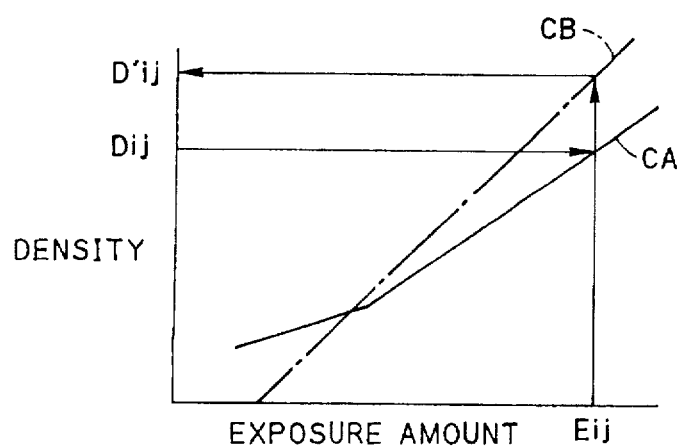
FIG. 11 is a graph illustrating a data conversion table of an image data correction device shown in FIG. 10.

Moreover, it is possible to connect an image data correction device 80 between the basic amount operation device 51 and the recording data operation device 52, as shown in FIG. 10. The image data correction device 80 converts the image data representative of a density value Dij to image data representative of a corrected density value D'ij in accordance with a conversion table shown in FIG. 11, showing the relationships between the density and the exposure amount. Specifically, a characteristic curve CA of a photographic film A is converted to a standard curve CB of a standard photographic film B. The standard curve may be a characteristic curve of a concrete photographic film, but may also be an ideal proportional curve throughout the whole range.

The conversion is made by determining a corresponding exposure amount Eij to a density Dij on the curve CA of the photographic film A, and then determining a density D'ij corresponding to the exposure amount Eij on the standard curve CB. In this embodiment, the image characteristic value derived from a plurality of image frames or a plurality of filmstrips may be obtained from the corrected data.

For this embodiment, the recording data operation device 52 uses the following equation:

$$\log E_{ij} = A_i(D_{mi} - D'_{ij}) - \Delta D + B_i \qquad (7)$$

wherein

D'ij is a corrected density of a color of pixel.

The above conversion or correction of the image data achieves the following effects:

1) The density compression of an under-exposed or over-exposed negative image is expanded to have a standard gradation, so that a high quality reproduction image can be obtained;

2) Even where the photographic film of the original and the recording material for reproduction do not match with each other, a high quality reproduction image can be obtained because the characteristic curve of the photographic film is converted to the standard curve.

In this way, the present invention make good use of the advantage of digital exposure method that data correction is easy to perform, while maintaining the advantage of the frame exposure method.

Figure 12:
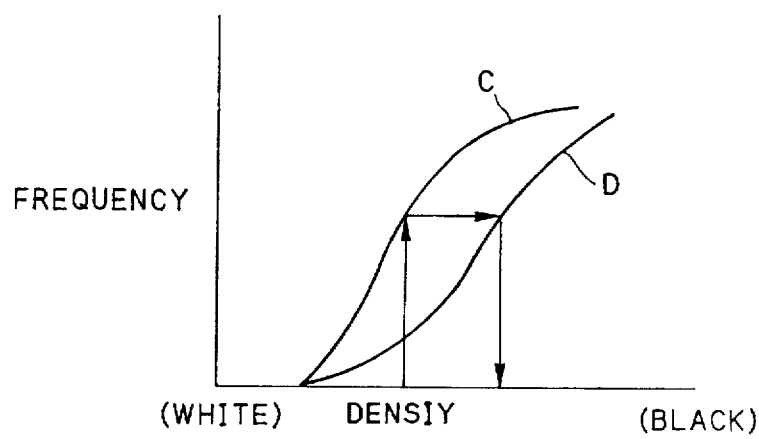
FIG. 12 is a graph illustrating an alternative example of data conversion table of the image data correction device shown in FIG. 10.
Figure 13:
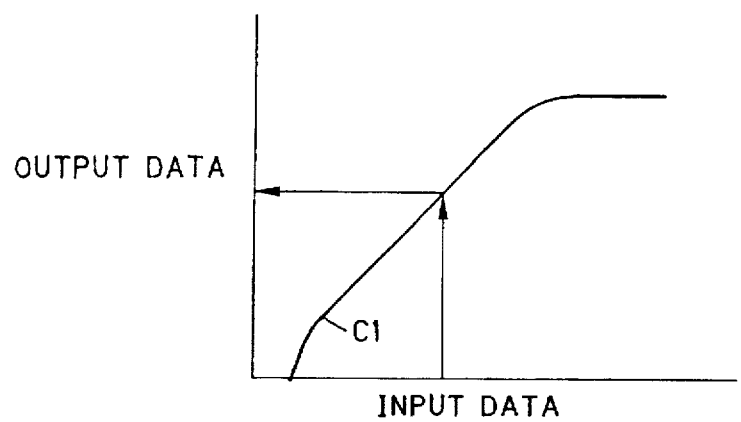
FIG. 13 is a graph illustrating another example of data conversion table of the image data correction device shown in FIG. 10.

It is alternatively possible to convert the image data in accordance with a conversion table shown in FIG. 12, wherein an image having a curve C an accumulated density histogram is converted to an image having a curve D of an accumulated density histogram.

Also it is possible to make a non-linear correction of the image data by use of a correction curve C1 which compresses a low density range to obtain a higher contrast or harder gradation.

The present invention includes those method where the recording data Eij is obtained from the image data Dij by use of a table showing a relationship between image data and recording data, as well as by use of the above equations (1) to (7).

The present invention is preferably applicable to making an index print from image frames of a negative photographic filmstrip at a low cost, compared with the conventional method wherein it is necessary to convert image data to a video signal for simulating a reproduced positive image on a CRT display for monitoring, and then make the index print by use of the video signal.

According to the present invention, those exposure control methods which have been used in the conventional frame exposure printing of photo-prints are applied to the digital printing method wherein image data is processed through a digital processing unit for correcting gradation and density balance based on highlight and shadow points or an accumulated density histogram. Therefore, the present invention takes advantages of both the digital image processing and the frame exposure printing, so that the quality of the reproduced image is improved while the quality variation between the reproduced images is minimized, compared with the conventional digital printing method.

Since the conventional digital printing methods have been attaching much importance to reproduction of highlight and shadow of the original, the prime subject is not always reproduced with sufficient color and density. As the present invention permits deciding reproduction conditions on the basis of data relating to the prime subject which is entered from outside or extracted from the image data, the density and color of the prime subject can be reproduced well.

According to the conventional digital printing methods where emphasis is put on reproduction of highlight and shadow of the original, the gradation cannot be reproduced well in some kinds of scenes. The present invention permits obtaining high quality reproduction even from such scenes by selecting an appropriate one of the above two methods: the method where emphasis is put on reproduction of highlight and shadow of the original, and the method where emphasis is put on reproduction of color and density of a prime subject.

Selective use of the above two methods according to the scene provide high quality images at such a high yield that has never been achieved in either the conventional digital exposure printing or the frame exposure printing.

Although the present invention has been described with respect to those embodiment where the digital printing is made based on image data detected from a negative image on negative photographic film, it is instead possible to use image data picked up through an electric still camera, or data of a positive image which is detected or read from reversal photographic film, a reflective original, or other recording media such as a compact disc.

The image recording unit 12 may have a two-dimensional exposure device such as a liquid crystal display (LCD) or CRT display instead of the beam scanning exposure device. The recording material is not limited to the color photosensitive paper 31, but may be a thermosensitive recording material. The present invention is also applicable to a wax transfer type or an ink transfer type thermal printing method, an ink jet printing method, and a toner transfer type printing method.

In the above embodiments, the image input unit 10, the image processing unit 11 and the image recording unit 12 are incorporated into a unit. But it is possible to compose the image input unit 10 and the image processing unit 11 as a separate unit from the image recording unit 12. The present invention is applicable not only to an apparatus for making a hard copy by printing an image on a recording medium such as the color photosensitive paper 31, the thermosensitive material or the like, but also to an apparatus for reproducing a soft copy on a display such as a CRT or LCD.

Thus, the present invention should not be limited to the above embodiments but, on the contrary, various modifications may be possible to those skilled in the art without departing from the scope of appended claims.

What is claimed is:

1. A digital image recording method for recording a positive reproduction image based on image data of a negative or positive original, said method comprising the steps of:

obtaining an image characteristic amount from said image data of said original;

determining a basic image recording amount from said image characteristic amount, said basic image recording amount being used for every pixel of one color;

determining an image control amount for a color pixel from said basic image recording amount and a value of said image data assigned to said color pixel; and recording said color pixel in accordance with said image control amount.

2. A digital image recording method according to claim 1, wherein said image characteristic amount includes an average of those image data values detected from an entire area or a part of said original, or an average of selected image data values, while said basic image recording amount is constituted of a density control value for controlling density of said positive reproduction image and a color control value for controlling color of said positive reproduction image.

3. A digital image recording method for recording a positive reproduction image based on image data of a negative or positive original, said method comprising the steps of:

obtaining an image characteristic amount from said image data of said original;

determining a basic image recording amount based on said image characteristic amount, said basic image recording amount being used for every pixel of one color;

determining recording data for recording a color pixel based on said basic image recording amount and a value of said image data assigned to said color pixel;

predetermining a look-up table or function defining a relationship between said recording data and an image control amount necessary for obtaining a recording density corresponding to said recording data;

determining said image control amount from said recording data in accordance with said relationship; and recording said color pixel in accordance with said image control amount.

4. A digital image recording method according to claim 3, wherein said image characteristic amount includes an average of those image data values detected from an entire area or a part of said original, or an average of selected image data values, while said basic image recording amount is constituted of a density control value for controlling density of said positive reproduction image and a color control value for controlling color of said positive reproduction image.

5. A digital image recording method for recording a positive reproduction image based on image data of a negative or positive original, said method comprising the steps of:

obtaining responsive to a first selection signal an image characteristic amount from said image data of said original to determine a basic image recording amount based on said image characteristic amount, said basic image recording amount being used for every pixel of one color;

determining recording data for recording a color pixel based on said basic image recording amount and a value of said image data assigned to said color pixel;

predetermining a look-up table or function defining a relationship between said recording data and a first image control amount necessary for obtaining a recording density corresponding to said recording data;

determining said first image control amount from said recording data in accordance with said relationship;

obtaining responsive to a second selection signal a second image control amount based on a highlight point and a shadow point of said original;

outputting one of said first and second selection signals depending upon conditions of said original, to select one of said first and second image control amounts; and recording each color pixel in accordance with said selected one of said first and second image control amounts.

6. A digital image recording method according to claim 5, wherein said image characteristic amount includes an average of those image data values detected from an entire area or a part of said original, or an average of selected image data values, while said basic image recording amount is constituted of a density control value for controlling density of said positive reproduction image and a color control value for controlling color of said positive reproduction image.

7. A digital image recording method for recording a positive reproduction image based on image data of a negative or positive original, said method comprising the steps of:

dividing said original into a large number of pixels to obtain said image data from said pixels;

deriving from said image data a plurality of image characteristic amounts which characterize said original, said image characteristic amounts including an average of those image data values obtained from a predetermined area of said original, an average of those image data values obtained from selected pixels, and differences between said image data values;

determining a basic image recording amount from said image characteristic amounts by an operation, said basic image recording amount defining color and density of said positive reproduction image;

determining recording data of a pixel from said basic image recording amount, a value of said image data assigned to said pixel, and a predetermined recording condition value; and recording said pixel in accordance with said recording data.

8. A digital image recording method according to claim 7, wherein all or part of said image data is corrected in accordance with a predetermined method, and said recording data is calculated from said corrected image data.

9. A digital image recording method according to claim 8, wherein said corrected image data is used for obtaining said plurality of image characteristic amounts.

10. A digital image recording method according to claim 8, wherein one or more of said plurality of image characteristic amounts is obtained from corrected image data of a plurality of images relating to one another.

11. A digital image recording method according to claim 7, wherein said recording condition value is predetermined so that a positive image reproduced from a reference image has predetermined color and density.

12. A digital image recording method according to claim 11, wherein said recording data is determined according to the following equation:

$$\log E_{ij} = A_i(D_{mi} - D_{ij}) + \Delta D + B_i$$

wherein $\log E_{ij}$ represents said recording data;

$D_{mi}$ represents said basic image recording amount;

$D_{ij}$ represents a density of a color pixel;

i represents one of three primary colors;

j represents a serial number of said pixel;

$\Delta D$ represents a manual correction value determined according to an observation; and $A_i$ and $B_i$ represent said recording condition values, wherein $A_i$ is a coefficient for correcting said image data with respect to an image data input device, said recording device and a spectral property of recording material, and $B_i$ is a coefficient for correcting variations caused by factors relating to the recording material and said recording device as well as daily variations.

13. A digital image processing apparatus for processing image data of a negative or positive original to record a positive image based on said image data, said apparatus comprising:

a basic amount operation device for determining a basic image recording amount from an image characteristic amount obtained from said image data of said original, said basic image recording amount being used for every pixel of one color;

a recording data operation device for determining recording data for recording a color pixel from said basic image recording amount and a value of said image data assigned to said color pixel; and a conversion device having a predetermined look-up table or function showing a relationship between said recording data and an image control amount necessary for obtaining a recording density corresponding to said recording data, to determine said image control amount from said recording data in accordance with said relationship.

14. A digital image processing apparatus for processing image data of a negative or positive original to record a positive reproduction image based on said image data, said apparatus comprising:

a first operation device for obtaining a basic image recording amount from an image characteristic amount detected from said image data, said basic image recording amount being used for every pixel of one color, and determining based on said basic image recording amount and a value of said image data assigned to a color pixel a first image control amount for recording said color pixel;

a second operation device for determining based on said image signal a second image control amount for recording a color pixel of said positive reproduction image, with reference to an image recording table which connects a highlight image reference point to a shadow image reference point; and a selection device for selecting one of said first and second operation devices.

15. A digital image recording apparatus for recording a positive reproduction image based on image data of a negative or positive original, said apparatus comprising:

a first operation device for obtaining a basic image recording amount from an image characteristic amount detected from said image data, said basic image recording amount being used for every pixel of one color, and determining based on said basic image recording amount and a value of said image data assigned to a color pixel a first image control amount for recording said color pixel;

a second operation device for determining based on said image signal a second image control amount for recording a color pixel of said positive reproduction image, with reference to an image recording table which connects a highlight image reference point to a shadow image reference point; and a selection device for selecting one of said first and second operation devices; and a recording device for recoding said positive reproduction image in accordance with said first or said second image control amount selected by said selection device.

16. A digital image processing apparatus for processing image data of a large number of pixels of a negative or positive original to record a positive reproduction image based on said image data, said apparatus comprising:

a basic amount operation device which obtains an image characteristic amount from said image data, and determines based on said image characteristic amount a basic image recording amount, said basic image recording amount defining color and density of said positive reproduction image; and a recording data operation device which determines recording data for recording a color pixel based on said basic image recording amount, a value of said image data assigned to said color pixel, and a predetermined recording condition value.

17. A digital image processing apparatus according to claim 16, wherein said basic amount operation device and said recording data operation device constitute a first operation device, and said digital image processing apparatus further comprises a second operation device for determining based on said image data second recording data for recording a color pixel, with reference to an image recording table which connects a highlight image reference point to a shadow image reference point; and a selection device for selecting one of said first and second operation devices.

18. A digital image processing apparatus according to claim 15, wherein all or part of said image data is corrected in accordance with a predetermined method, and said recording data is calculated from said corrected image data.

19. A digital image recording apparatus for recording a positive reproduction image based on image data of a negative or positive original, said apparatus comprising:

an image input device which divides said original into a large number of pixels to detect said image data from said pixels;

a first operation device consisting of a basic amount operation device and a recording data operation device, said basic amount operation device obtaining an image characteristic amount from said image data, to determine based on said image characteristic amount a basic image recording amount, said basic image recording amount defining color and density of said positive reproduction image, said recording data operation device determining first recording data for recording a color pixel based on said basic image recording amount, a value of said image data assigned to said color pixel, and a predetermined recording condition value;

a second operation device for determining based on said image data second recording data for recording a color pixel, with reference to an image recording table which connects a highlight image reference point to a shadow image reference point;

a selection device for selecting one of said first and second operation devices; and a recording device for recoding said positive reproduction image in accordance with said first or said second recording data from said selected one of said first and second operation devices.

20. A digital image recording apparatus according to claim 19, wherein said recording condition value is predetermined so that a positive image having predetermined color and density will be reproduced from a reference image.

21. A digital image recording apparatus according to claim 20, wherein said first recording data is determined according to the following equation:

$$\log E_{ij} = A_i(D_{mi} - D_{ij}) + \Delta D + B_i$$

wherein logEij represents said first recording data;

Dmi represents said basic image recording amount;

Dij represents a density of a color pixel;

i represents one of three primary colors;

j represents a serial number of said pixel;

ΔD represents a manual correction value determined according to an observation; and Ai and Bi represent said recording condition values, wherein Ai is a coefficient for correcting said image data with respect to said image data input device, said recording device and a spectral property of recording material, and Bi is a coefficient for correcting variations caused by factors relating to the recording material and said recording device as well as daily variations.

* * * * *